LOGIC SYSTEM

Filed Aug. 31, 1960 2 Sheets-Sheet 1

CONVENTIONAL T.R.L. SYSTEM

INVENTOR
L. HASDORFF
BY Lucian C. Canepa
ATTORNEY

INVENTOR
L. HASDORFF
BY Lucian C. Canepa
ATTORNEY

United States Patent Office 3,192,396

Patented June 29, 1965

3,192,396
LOGIC SYSTEM

Lawrence Hasdorff, Madison, N.J., assignor to Bell Telephone Laboratories, Incorporated, New York, N.Y., a corporation of New York Filed Aug. 31, 1960, Ser. No. 53,303

2 Claims. (Cl. 307—88.5)

Figure 1:
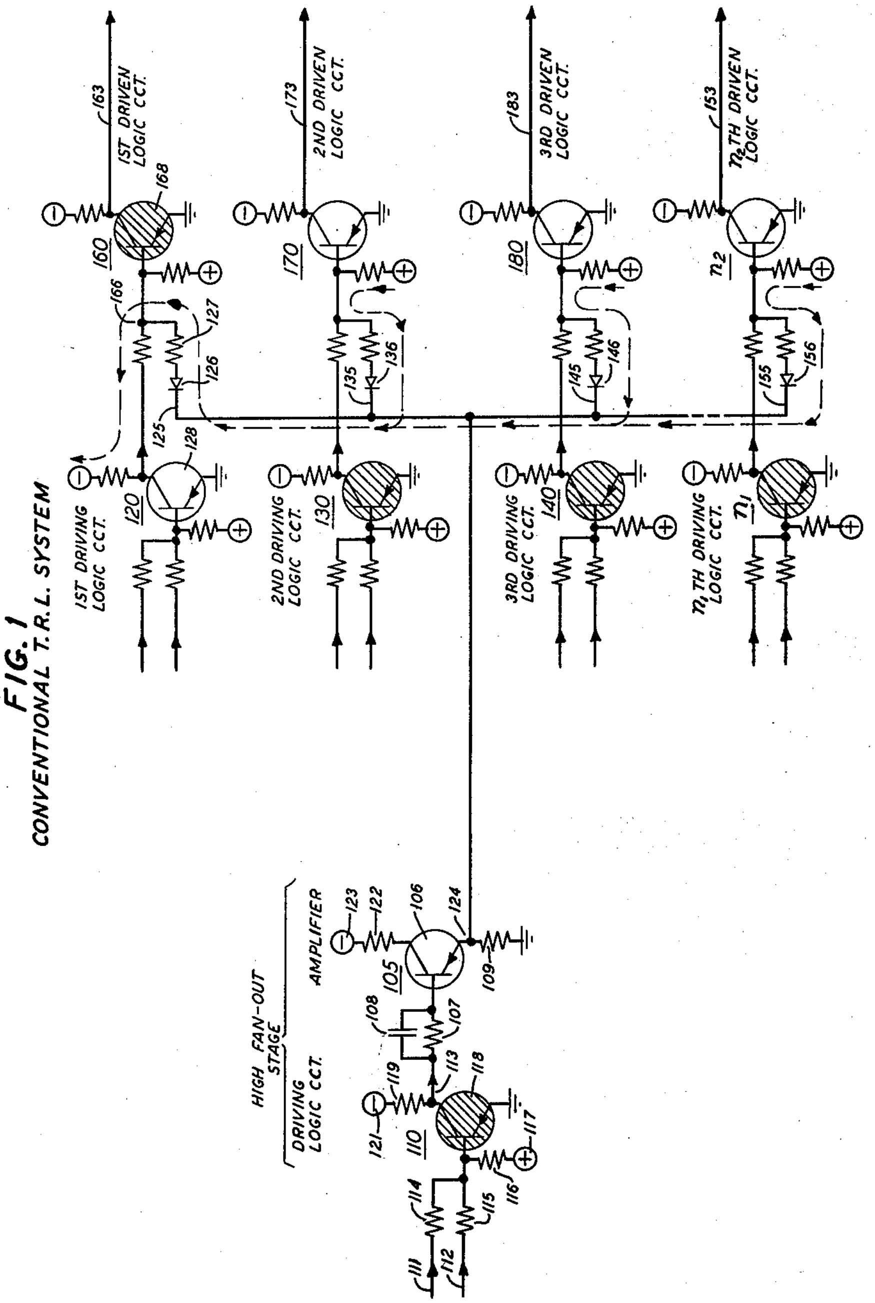

This invention relates to the processing of digital information, and more particularly to transistor resistor logic systems.

Typical of the logic technologies from which the circuitry of a digital information processing system may be constructed is transistor resistor logic or TRL, which includes a basic logic circuit or building block comprising a transistor and a plurality of resistors.

Whenever a relatively large number of TRL circuits is to be controlled by a single driving TRL circuit, it is necessary, in order to insure sufficient drive to and proper operation of the controlled or driven circuits, that an amplifier be interposed between the driving and the driven circuits. Moreover, in those TRL systems in which each of the circuits driven by such an amplifier is also driven by at least one other driving logic circuit, it is necessary that each of the output paths emanating from the amplifier include an isolating diode. These isolating diodes prevent undesired interactions among the driven logic circuits, which interactions might, for example, cause a driven circuit to be turned off at a time when it was intended that it be on.

An object of the present invention is the improvement of logic systems.

More specifically, an object of this invention is the provision of a reliable and economical TRL system which includes a driving amplifier whose output paths do not require isolating diodes.

These and other objects of the present invention are realized in a specific illustrative embodiment thereof which includes a driving emitter-follower amplifier that is coupled to a plurality of driven logic circuits each of which is also driven by at least one other driving circuit. Connected to the amplifier is a variable clamping circuit which maintains the output terminal of the amplifier slightly negative with respect to ground during the time that the amplifier is nonconducting, which is when interaction currents tend to flow among the driven logic circuits. This slightly negative potential acts as a sink for the interaction currents that would otherwise flow among the driven logic circuits. Since the interaction currents are in this manner diverted to the variable clamping circuit, the need for isolating diodes in the output paths of the amplifier is eliminated.

The potential at the output terminal of the amplifier must, when the amplifier conducts, go more negative than the aforementioned slightly negative clamp voltage. This more negative excursion is allowed to take place by automatically disconnecting the clamping circuit from the output terminal during the time in which the amplifier conducts.

The automatic disconnection of the clamping circuit stems from the fact that the clamping circuit includes a transistor whose inputs are the same as those to the logic circuit which drives the amplifier. Thus, whenever the logic circuit which drives the amplifier is turned off, thereby turning the amplifier on, the transistor of the clamping circuit is also turned off, thereby disabling the clamping circuit and permitting the potential of the amplifier output terminal to be determined by the conduction condition of the amplifier.

Thus, a TRL system made in accordance with the principles of the present invention does not require isolating diodes in the output paths emanating from the driving amplifier thereof, but, instead, utilizes a variable clamping circuit connected to the output terminal of the amplifier to insure reliable operation of the system.

It is a feature of the present invention that a transistor resistor logic system include a driving amplifier whose output terminal is connected to a variable clamping circuit.

It is another feature of this invention that a transistor resistor logic system include a logic circuit driving an amplifier, that the output terminal of the amplifier be connected to a variable clamping circuit, and that the clamping circuit and the logic circuit each have the same configuration and the same input signals applied thereto, whereby the need for isolating diodes in the amplifier output paths is obviated.

Figure 2:
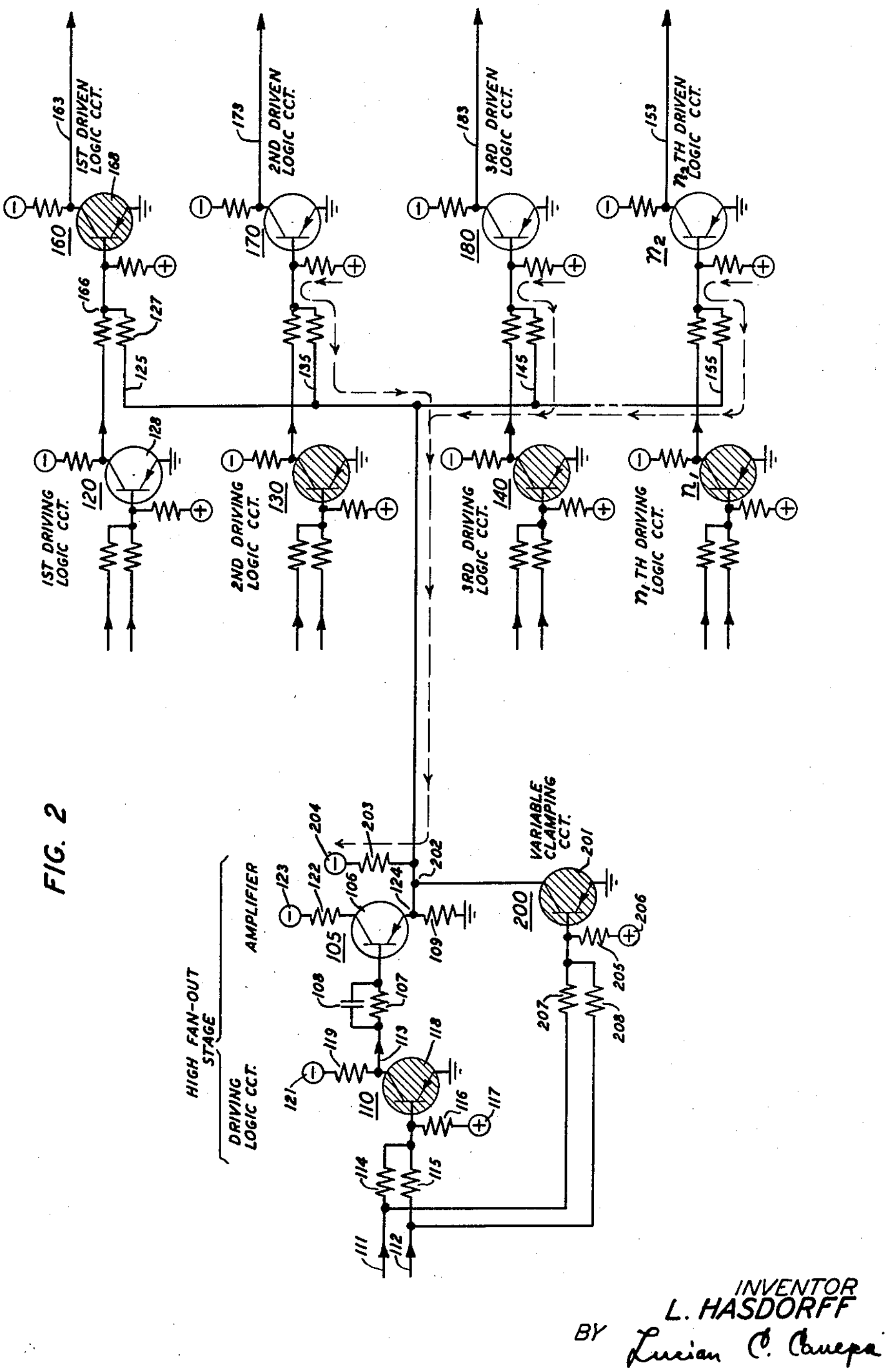

A complete understanding of the above and other features and advantages thereof may be gained from a consideration of the following detailed description of an illustrative embodiment thereof presented hereinbelow in connection with the accompanying drawing, in which:

FIG. 1 is a circuit diagram of a conventional TRL system comprising an emitter-follower amplifier each of whose output paths includes an isolating diode; and FIG. 2 is a circuit diagram of a specific illustrative TRL system made in accordance with the principles of the present invention.

Referring now to FIG. 1, there is shown a conventional TRL system comprising an emitter-follower amplifier 105 and a plurality of identical logic circuits 110, 120, 130, 140 . . . $n_1$, 160, 170, 180 . . . $n_2$. The logic circuit 110, for example, includes two leads 111 and 112 to which may be coupled input signals, whereby there is produced on lead 113 an output signal that is a logical function of the input signals. The circuit 110 also includes input resistors 114 and 115, a base bias resistor 116, a positive source 117 of direct-current power, a p-n-p transistor 118, a collector bias resistor 119, and a negative source 121 of direct-current power.

If a voltage at or near ground potential is assumed to represent the binary value "1" and if a relatively high negative voltage is designated "0," the logic circuit 110 performs the function of providing on the lead 113 a "1" signal if a "0" signal is applied to one or both of the input leads 111 and 112. On the other hand, a "0" signal appears on the output lead 113 only if each of the input leads 111 and 112 has a "1" signal coupled thereto. Such a configuration is the basic TRL building block and is commonly referred to as an AND-NOT circuit.

Whenever a relatively large number of logic circuits is to be controlled by the logic circuit 110, it is necessary, in order to insure sufficient drive to and proper operation of the controlled or driven circuits, that an amplifier be interposed between the driving and the driven circuits. Thus, as shown in FIG. 1, the amplifier 105 is interposed between the driving logic circuit 110 and the plurality of driven logic circuits 160, 170, 180 . . . $n_2$.

The amplifier 105 includes a transistor 106 whose base electrode is coupled through a resistor 107 and a capactor 108 to the output lead 113 of the logic circuit 110 of FIG. 1. The amplifier 105 also includes an emitter resistor 109, a collector bias resistor 122, a negative source 123 of direct-current power, and an output terminal 124.

Whenever the transistor 118 of the driving logic circuit 110 is in its conducting condition, represented by parallel diagonal lines within the transistor symbol, the potential of the output lead 113 with respect to ground is relatively low, viz., the collector-to-emitter voltage drop of the transistor 118, which low potential, as specified above, is indicative of a "1" signal. This low potential is insufficient to turn on the transistor 106 of the noninverting amplifier 105, whereby the potential of the amplifier output terminal 124 with respect to ground is zero, which is indicative of a "1" signal.

On the other hand, whenever the transistor 118 of the driving logic circuit 110 is in its nonconducting condition, the potential of the output lead 113 with respect to ground is a relatively high negative voltage representative of a "0" signal, and the source 121 and the resistors 119 and 107 then provide sufficient base drive to the transistors 106 to saturate it, whereby a current flows through the emitter resistor 109 to make the amplifier output terminal 124 sufficiently negative with respect to ground to represent a "0" signal and to drive all of the logic circuits 160, 170, 180 . . . $n_2$ into conduction.

It is noted that the term "fan-out" is commonly employed to specify the number of logic circuits driven by a driving logic circuit. Thus, to indicate that a driving circuit has a fan-out of, say, 10, is to specify that the circuit is coupled to 10 driven circuits. In accordance with this terminology and the assumption made hereinabove that the amplifier 105 is coupled to a relatively large number of driven logic circuits 160, 170, 180 . . . $n_2$, the combination of the driving logic circuit 110 and the amplifier 105 may be termed a high fan-out stage, and is so designated in FIGS. 1 and 2.

Connected to the output terminal 124 of the emitter-follower amplifier 105 of the high fan-out stage shown in FIG. 1 is a plurality of output paths 125, 135, 145 . . . 155 each of which extends through a series combination comprising an asymmetrically-conducting diode element and a resistor to the base or input electrode of one of the driven logic circuits 160, 170, 180 . . . $n_2$. Thus, for example, the output path 125 is connected to the cathode electrode of a diode 126 whose plate electrode is connected through a resistor 127 to the base electrode of a transistor 168 of the first driven logic circuit 160.

Also coupled to the input of the first driven logic circuit 160 is the first driving logic circuit 120. Similarly, the driven logic circuits 170, 180 . . . $n_2$ are respectively driven by the logic circuits 130, 140 . . . $n_1$.

The function which the diodes 126, 136, 146 . . . 156 perform in the system of FIG. 1 can be clearly understood if it is assumed for the moment that each of the diodes is replaced by a short circuit and, further, that the pattern of signals applied to the inputs of the driving logic circuits 110, 120, 130, 140 . . . $n_1$ is such as to cause conduction in all of the transistors thereof except the transistor 128 of the logic circuit 120. Such a pattern of input signals causes only the transistor 168 of the driven logic circuits 160, 170, 180 . . . $n_2$ to conduct. As a result, the signals appearing on output leads 163, 173, 183 . . . 153 are "1," "0," "0" . . . "0," respectively.

In the absence of the diode 126 in the output path 125 of the logic system of FIG. 1, interaction currents would flow, in the directions indicated by the dashed lines, from the positive bias sources respectively connected to the base electrodes of the nonconducting transistors of the driven logic circuits 170, 180 . . . $n_2$ to drive the base electrode of the conducting transistor 168 of the first driven logic circuit 160 toward a more positive potential with respect to ground. These interaction currents may, depending on the number of driven logic circuits and the tolerances of the system, be capable of driving the base electrode of the transistor 168 sufficiently positive to cause the level of conduction in the transistor 168 to fall below a preassigned value, in which case the driving capabilities of the circuit 160 with respect to other logic circuits (not shown) would be impaired. Or these interaction currents may cause the transistor 168 to stop conducting altogether, in which case an incorrect pattern of signals, viz., "0," "0," "0" . . . "0" would appear on the output leads 163, 173, 183 . . . 153, respectively.

The above-specified interaction currents may be blocked from flowing to the point 166 connected to the base electrode of the transistor 168 by including in the output path 125 the diode 126, which, as seen in FIG. 1, is properly poled to prevent the flow therethrough of the undesired interaction currents, thereby insuring reliable operation of the logic system including the circuit 160.

Similarly, the output paths 135, 145 . . . 155 include therein the isolating or blocking diodes 136, 146 . . . 156, respectively, each of which insures that the operation of its associated driven logic circuit is reliable in the case wherein the associated circuit is the only one of the driven logic circuits which is intended to be in a conducting condition.

Thus, a reliable TRL system of the conventional type shown in FIG. 1 includes therein, for the illustrative case of a fan-out of 10, an amplifier having 10 output paths each of which includes an isolating diode.

The TRL system depicted in FIG. 2 illustratively embodies the principles of the present invention. The illustrative system differs from the one shown in FIG. 1 and described above in that in the system of FIG. 2 the output paths emanating from the amplifier 105 do not include therein isolating diodes and, further, in that the amplifier output terminal 124 of the system of FIG. 2 has connected thereto a variable clamping circuit. The significance of these differences is evident by noting that a conventional TRL system including an amplifier having a fan-out of 10 requires 10 isolating diodes, whereas in the specific illustrative TRL system shown in FIG. 2 the 10 diodes are replaced by a variable clamping circuit comprising a single transistor and associated components.

The variable clamping circuit 200 of FIG. 2 includes a p-n-p transistor 201 whose collector electrode is connected to a point 202, which, in turn, is directly connected to the output terminal 124 of the amplifier 105. Also, the collector electrode of the transistor 201 is connected through a bias resistor 203 to a negative source 204 of direct-current power. Connected to the base electrode of the transistor 201 is one end of a base bias resistor 205 whose other end is connected to a positive source 206 of direct-current power. Also connected to the base electrode of the transistor 201 are input resistors 207 and 208 whose left-hand ends are connected to the input leads 111 and 112, respectively.

The configuration of the variable clamping circuit 200 is identical to that of the driving logic circuit 110, and the inputs to each are also identical. Accordingly, whenever the transistor 118 of the driving logic circuit 110 is in a conducting condition, the transistor 201 of the variable clamping circuit 200 also conducts, thereby clamping the point 202 and the output terminal 124 of the amplifier 105 at a slightly negative potential with respect to ground, viz., the collector-to-emitter voltage drop of the transistor 201. As a result, for the case where the pattern of signals applied to the input of the driving logic circuits 110, 120, 130, 140 . . . $n_1$ causes all of the transistors thereof to conduct except the transistor 128 of the logic circuit 120, thereby causing only the transistor 168 of the driven logic circuits 160, 170, 180 . . . $n_2$ to conduct and the resultant signal pattern appearing on the output leads 163, 173, 183 . . . 153 to be "1," "0," "0" . . . "0," respectively, interaction currents do not flow in the output path 125 to interfere with the desired operation of the illustrative logic system. More specifically, currents do flow from the positive bias sources respectively connected to the base electrodes of the non-conducting transistors of the driven logic circuits 170, 180 . . . $n_2$, but these currents are diverted by the slightly negative potential of the output terminal 124 to flow in the direction indicated by the dashed lines of FIG. 2. This slightly negative potential acts as a sink for the currents which would otherwise flow among the driven logic circuits. Since the interaction currents are in this manner diverted to the variable clamping circuit 200, the need for isolating diodes in the output paths 125, 135, 145 . . . 155 is clearly obviated.

The potential with respect to the ground of the amplifier output terminal 124 must, when the transistor 106 of the amplifier 105 conducts, become more negative than the slightly negative clamp voltage imposed by the collector-to-emitter voltage drop of the clamping transistor 201. This more negative excursion of the terminal 124 is allowed to take place by automatically disconnecting the variable clamping circuit 200 from the output terminal 124 during the conducting time of the amplifier 105.

The automatic disconnection of the variable clamping circuit 200 derives from the fact that, as specified above, the circuit 200 includes a transistor 201 whose inputs are the same as those to the driving logic circuit 110 which drives the amplifier 105. Accordingly, whenever the transistor 118 of the logic circuit 110 is turned off, thereby turning on the amplifier 105, the transistor 201 of the variable clamping circuit 200 is also turned off, thereby allowing the potential of the output terminal 124 to be determined solely by the current flow through the emitter resistor 109.

An illustrative set of values for the components of one of the identical logic circuits included in the system shown in FIG. 2, for example, the logic circuit 110, is as follows: resistors 114 and 115—each 3650 ohms; resistor 116—32,400 ohms; positive source 117—12 volts; resistor 119—1330 ohms; and negative source 121—12 volts. Additionally, illustrative values for the components 109, 122, and 123 of the amplifier 105 for a fan-out of 10, are 274 ohms, 187 ohms, and 12 volts, respectively.

It is noted that a copending application of E. L. Seley and R. C. Stone, Serial No. 53,304, filed August 31, 1960, now Patent 3,048,716, issued August 7, 1962, is directed to a logic system which is related to that disclosed herein.

It is to be understood that the above-described arrangements are only illustrative of the application of the principles of the present invention. Numerous other arrangements may be devised by those skilled in the art without departing from the spirit and scope of the invention.

What is claimed is:

1. In combination in a transistor resistor logic system, an amplifier adapted to control a plurality of driven transistor resistor logic circuits, said amplifier comprising an emitter output electrode and a resistive element connected between said emitter electrode and a point of reference potential, a driving transistor resistor logic circuit connected to said amplifier for causing said amplifier to assume a nonconducting condition whenever said driving logic circuit is in a conducting condition and for causing said amplifier to assume a conducting condition whenever said driving logic circuit is in a nonconducting condition, and means connected to the emitter electrode of said amplifier for clamping said electrode only during the nonconducting condition of said amplifier, wherein said means for clamping said emitter electrode comprises a transistor resistor logic circuit whose configuration is identical to that of said driving transistor resistor logic circuit.

2. A combination as in claim 1 further including means for applying identical input signals in parallel to said driving transistor resistor logic circuit and to said transistor resistor logic circuit included in said means for clamping said emitter electrode of said amplifier.

References Cited by the Examiner

UNITED STATES PATENTS

| | | | |
|---|---|---|---|
| 2,963,594 | 12/60 | Bruce et al. | 307—88.5 |
| 3,016,467 | 1/62 | Carroll | 307—88.5 |
| 3,023,323 | 2/62 | Kojalowicz | 307—88.5 |
| 3,048,716 | 8/62 | Seley et al. | 307—88.5 |

FOREIGN PATENTS

| | | |
|---|---|---|
| 1,182,913 | 7/59 | France. |

OTHER REFERENCES

Miller, RCA Technical Note No. 350, November 1959 (1 page).

ARTHUR GAUSS, *Primary Examiner.*

FREDERICK M. STRADER, JOHN W. HUCKERT, *Examiners.*